June 24, 1930.  A. MOORE  1,766,674
APPARATUS FOR CONTROL OF COMBUSTION IN INTERNAL COMBUSTION ENGINES
Filed Dec. 30, 1926  7 Sheets-Sheet 1
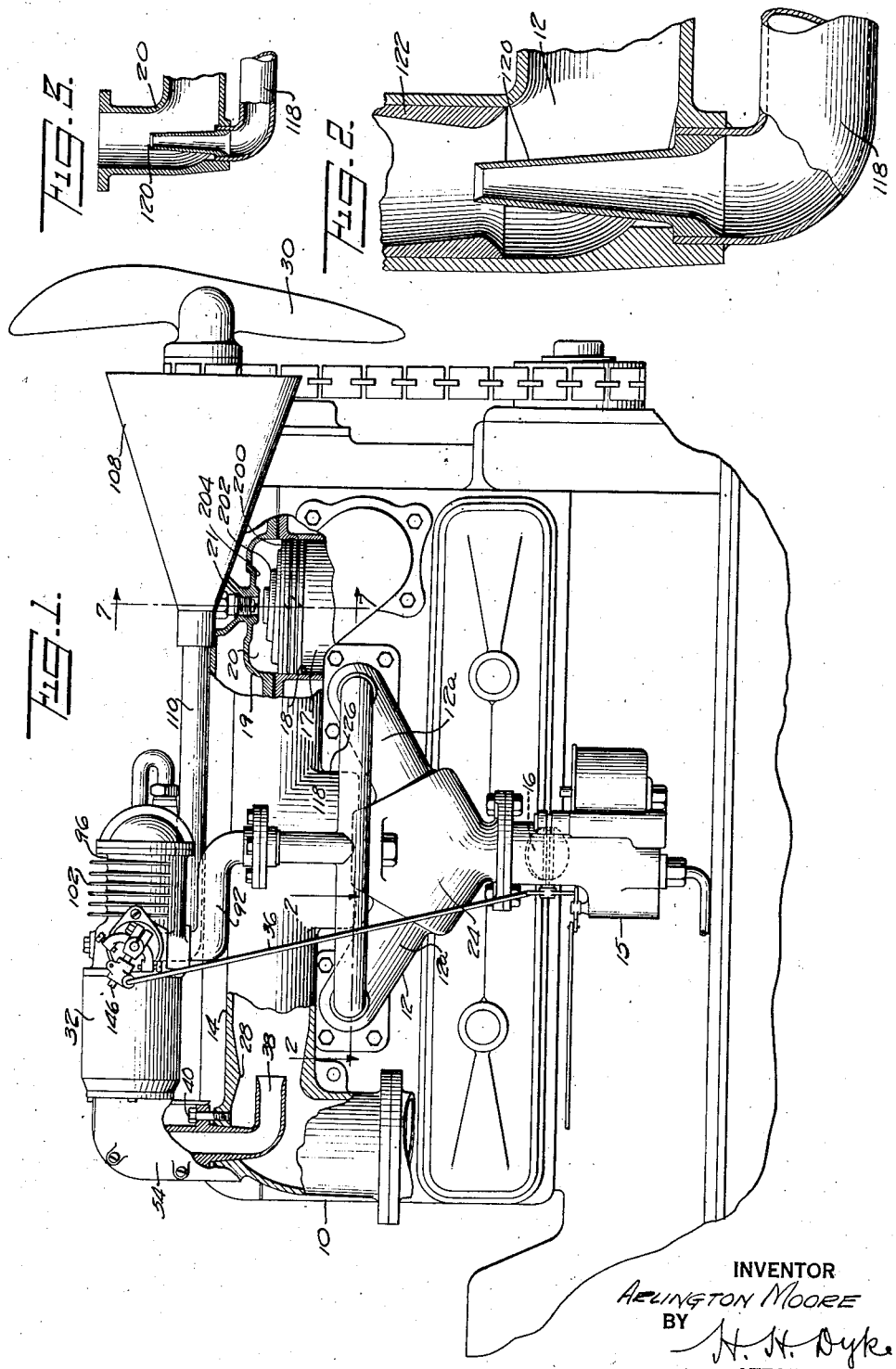
INVENTOR
ARLINGTON MOORE
BY
H. H. Dyk.
ATTORNEY June 24, 1930.  A. MOORE  1,766,674
APPARATUS FOR CONTROL OF COMBUSTION IN INTERNAL COMBUSTION ENGINES
Filed Dec. 30, 1926   7 Sheets-Sheet 2
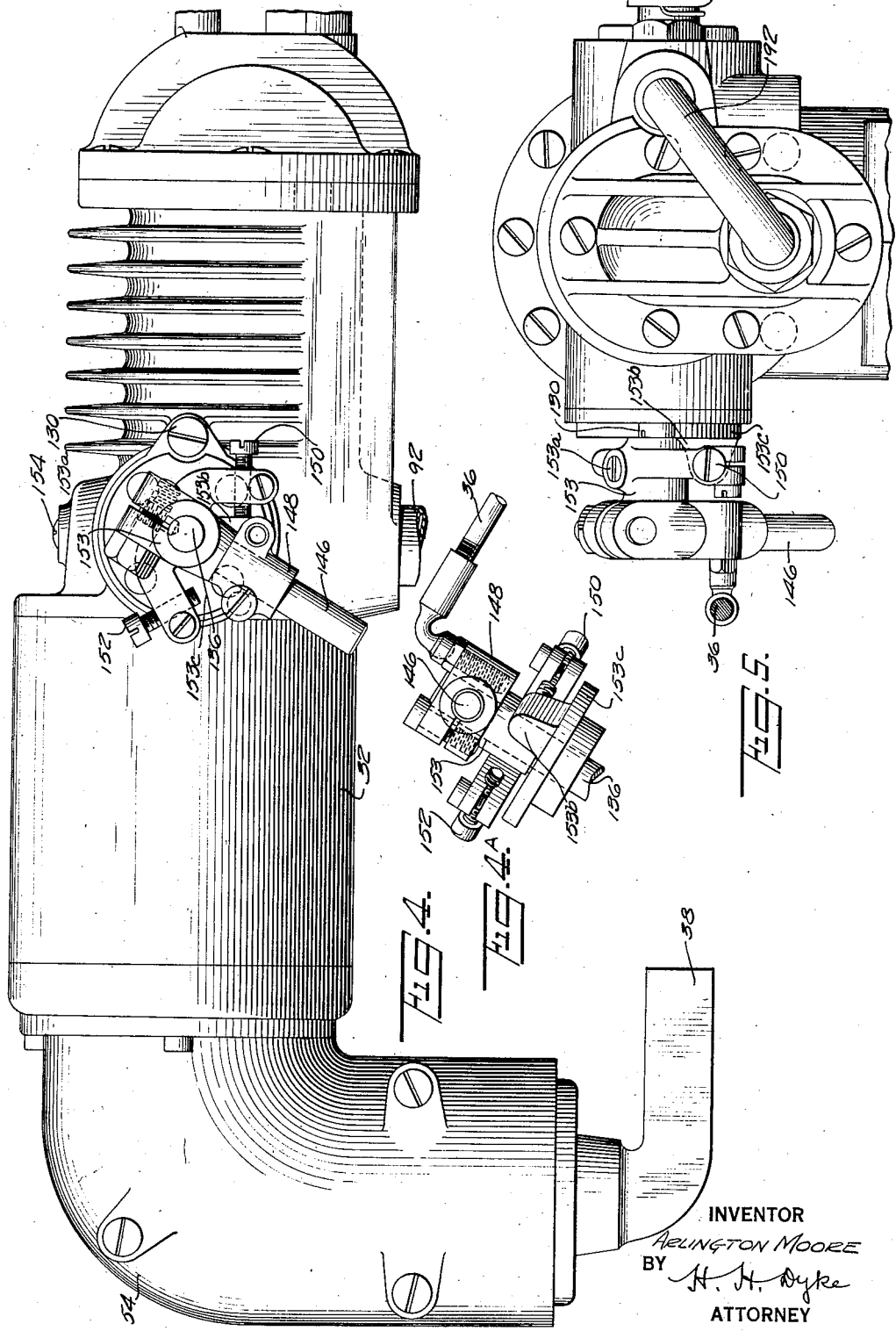
INVENTOR
ARLINGTON MOORE
BY
ATTORNEY

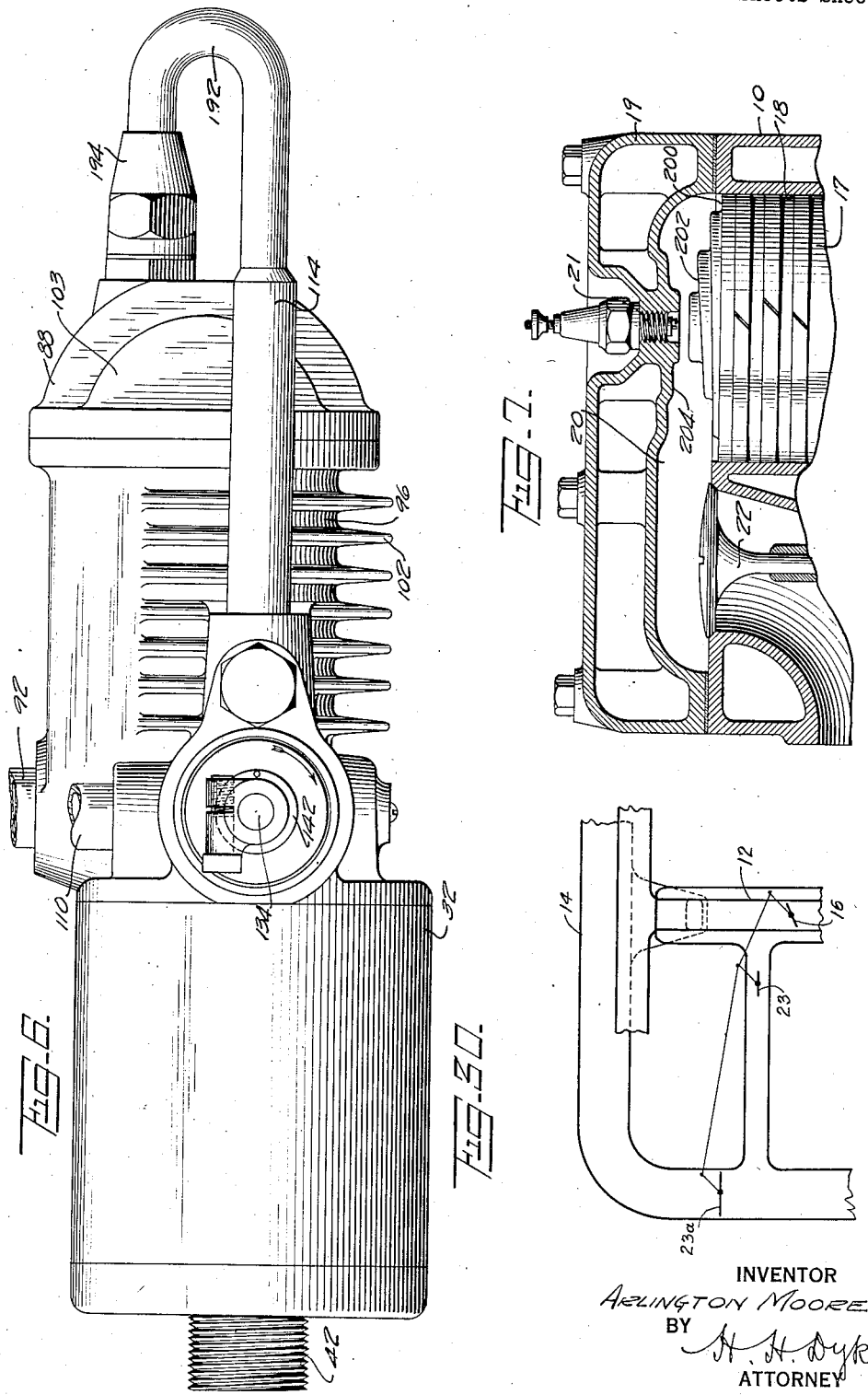

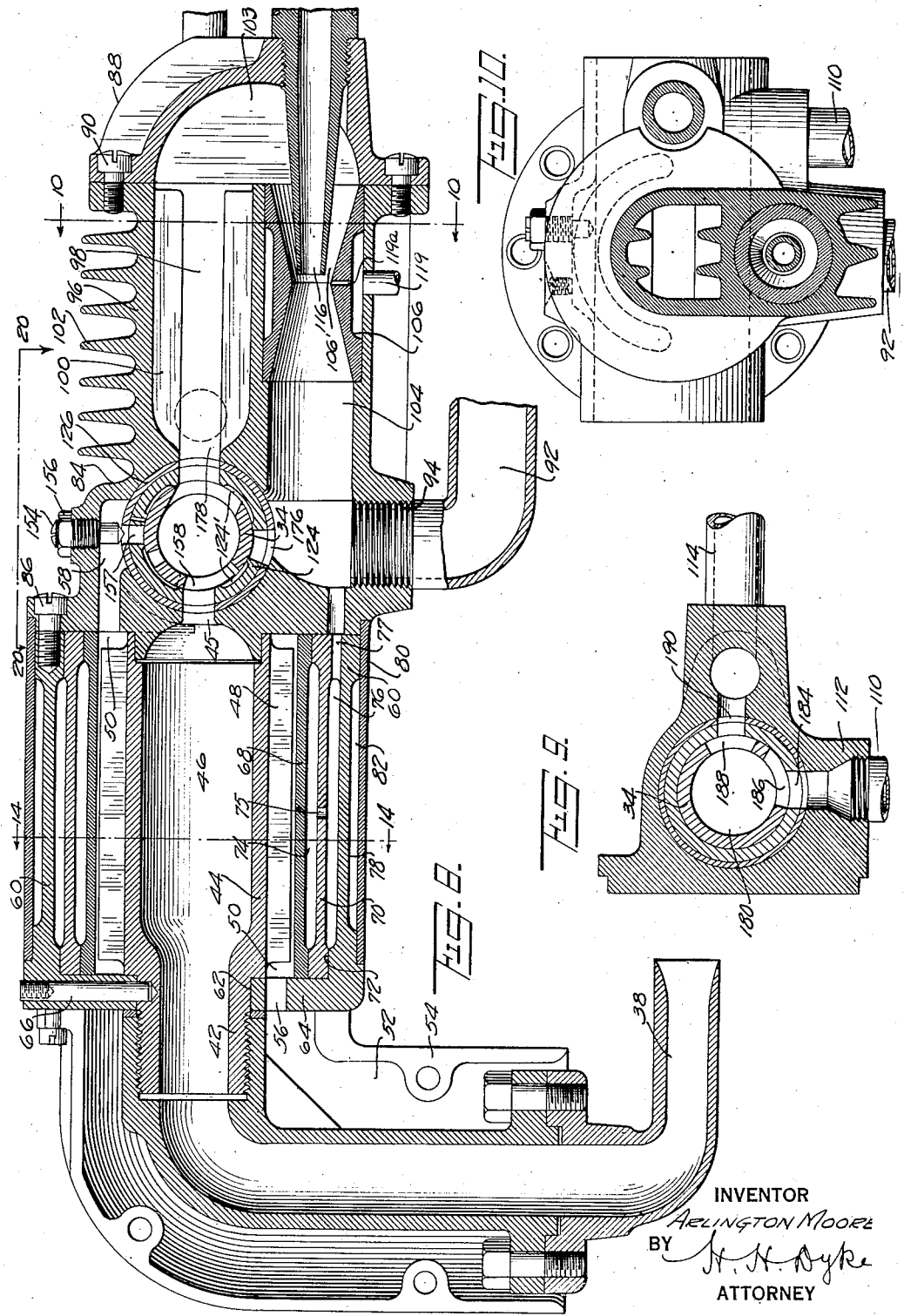

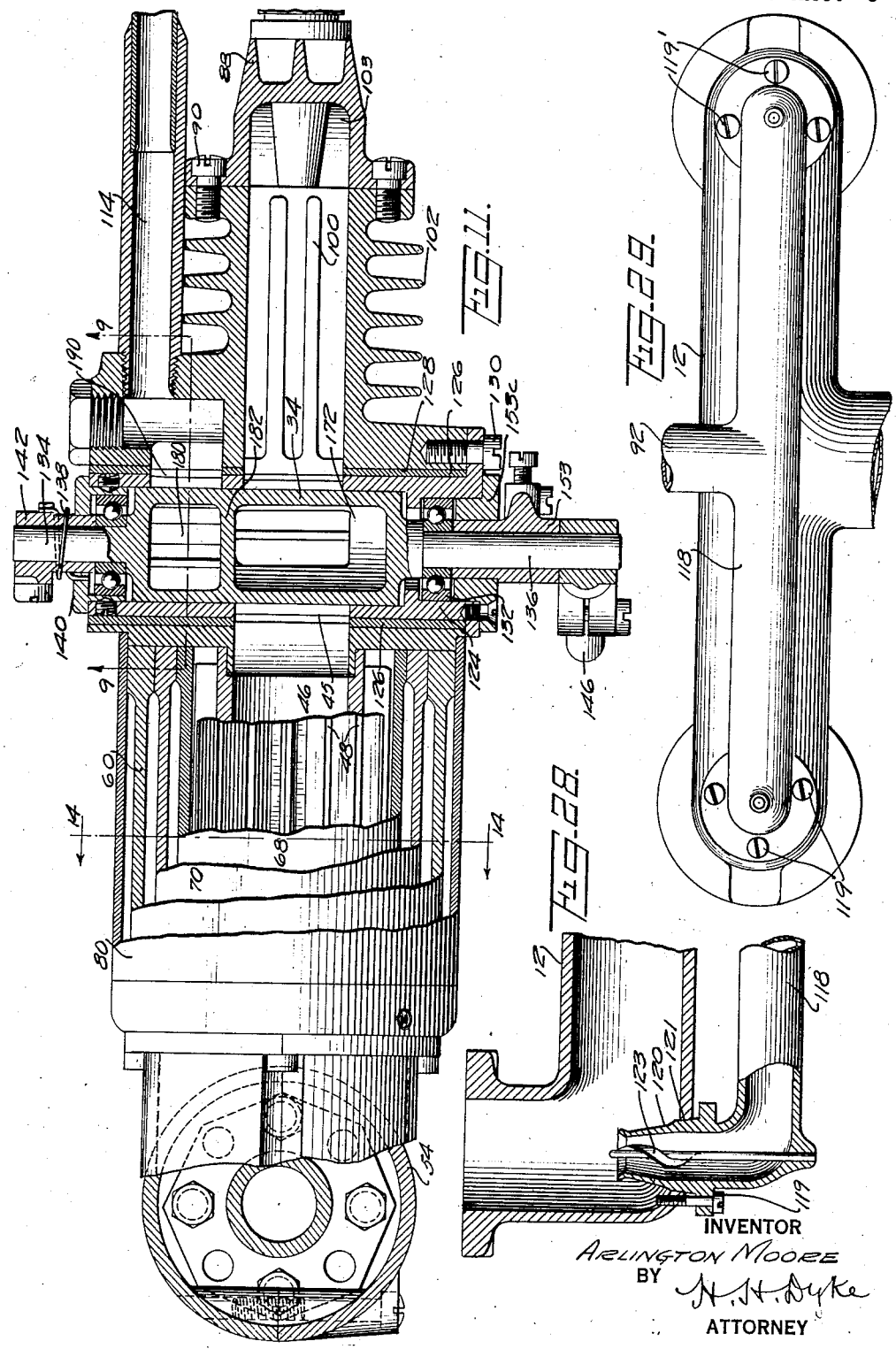

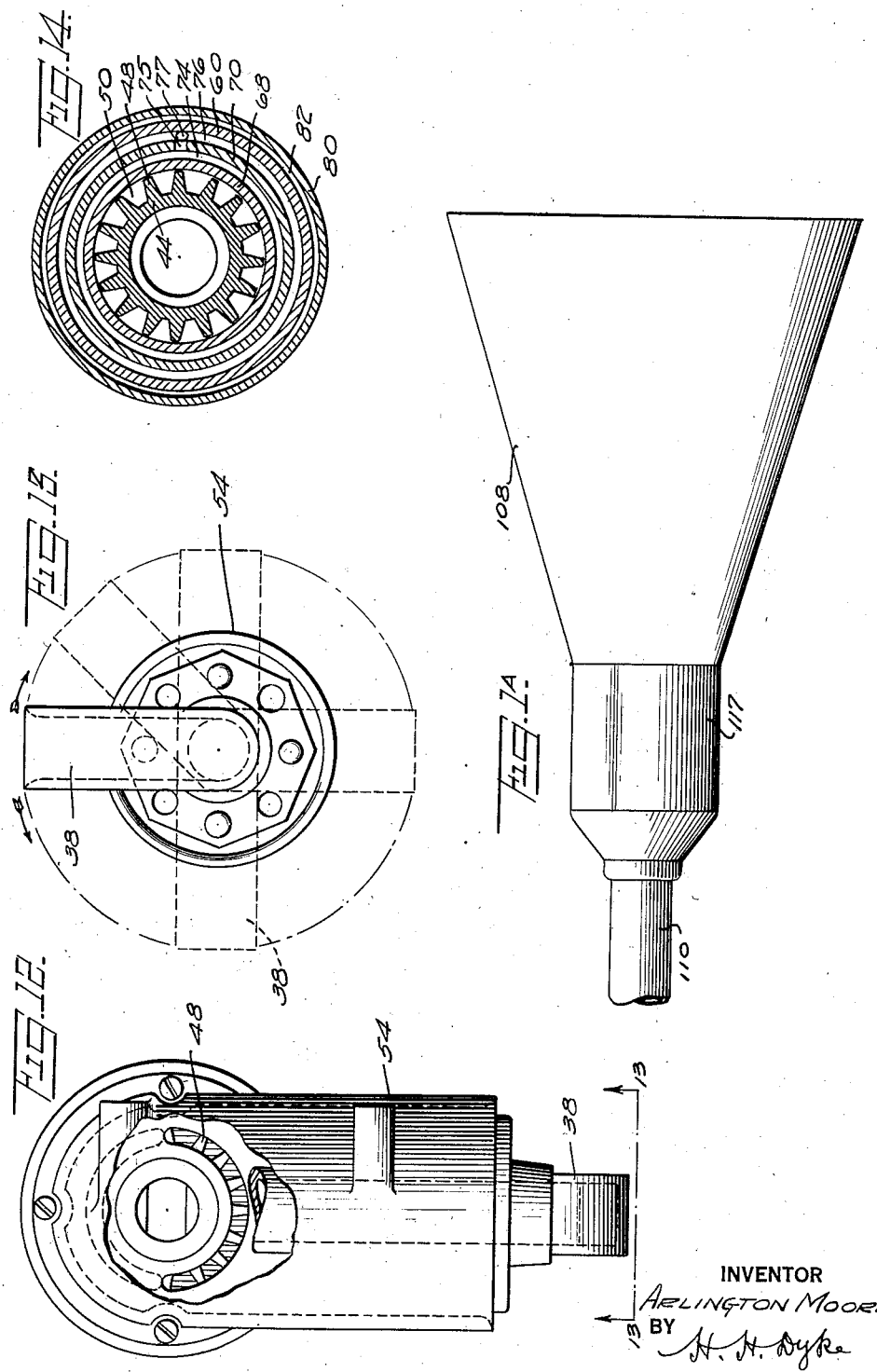

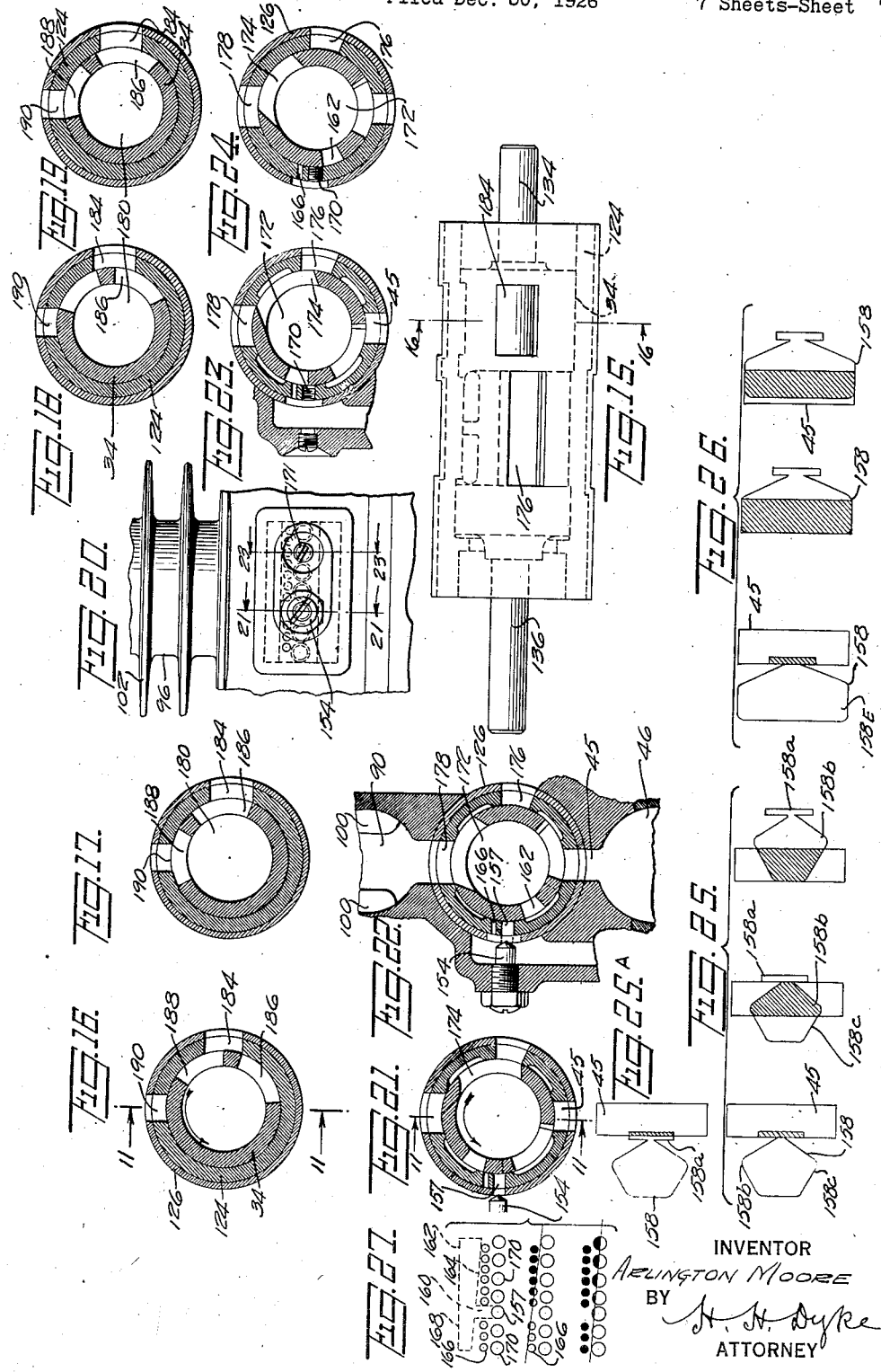

Patented June 24, 1930

1,766,674

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

APPARATUS FOR CONTROL OF COMBUSTION IN INTERNAL-COMBUSTION ENGINES

Application filed December 30, 1926. Serial No. 158,015.

My invention is of an apparatus for control of combustion in internal combustion engines.

With my apparatus exhaust gas of the engine and air are supplied to the engine cylinders in addition to the fuel and air mixture from the carburetor, in proportions and quantities and at temperatures and pressures automatically metered and regulated throughout the idling and power ranges of the engine.

In the drawings forming part hereof and illustrating a preferred embodiment of the invention. Fig. 1 is a side view, partly in section, of an internal combustion engine equipped with combustion control means in accordance with my invention. Fig. 1$^a$ is a modification of the showing of a part of Fig. 1, the modification consisting in the inclusion of an air cleaner. Fig. 2 is a detail section on line 2—2, Fig. 1. Fig. 3 is a detail section similar to Fig. 2, with the venturi tube of Fig. 2 omitted. Fig. 4 is a side view of the metering and heat control apparatus on an enlarged scale. Fig. 4$^a$ is an end view of the meter crank of Fig. 4. Fig. 5 is an end view of Fig. 4. Fig. 6 is a side view looking at the opposite side from Fig. 4. Fig. 7 is a section on line 7—7, Fig. 1. Fig. 8 is a longitudinal sectional view. Fig. 9 is a detail sectional view on the line 9—9, Fig. 11. Fig. 10 is a sectional view on line 10—10, Fig. 8. Fig. 11 is a longitudinal part sectional view on a plane at right angles to that of Fig. 8. Fig. 12 is an end view showing the end opposite that shown in Fig. 5 and with parts broken away. Fig. 13 is a bottom plan view of the impact tube and its connection, looking upward from the line 13—13, Fig. 12. Fig. 14 is a section on the line 14—14, Fig. 11. Fig. 15 is a side view of the removable valve unit including rotary meter and its sleeve. Figs. 16, 17, 18 and 19 are sections on line 16—16, Fig. 15 (corresponding to line 9—9, Fig. 11) and showing several positions of the rotary meter ports for controlling the passage of cold air. Fig. 20 is a fragmentary plan view looking downward from line 20—20, Fig. 8. Figs. 21 and 22 are sections on the line 21—21, Fig. 20 and showing two positions of the rotary meter ports for controlling the passage of preheated air and exhaust gas, the meter rotor being in the same position as in Figs. 16 and 17 respectively. The position of rotor meter in Figs. 16 and 21 is the same as shown in Fig. 11, and the position of Figs. 17 and 22 is the same as shown in Figs. 9 and 8 respectively. Figs. 23 and 24 are sections on line 23—23, Fig. 20, the meter rotor being in the same position as in Figs. 18 and 19 respectively. Fig. 25 is a diagrammatical view showing three positions of the exhaust gas ports for low compression engines. Fig. 25$^a$ is similar to Fig. 25 and shows a different rotor position and initial setting of the exhaust gas port for using a reduced quantity of exhaust gas for idling. Fig. 26 is a view similar to Fig. 25 and showing three positions of the exhaust gas ports for high compression engines. Fig. 27 is a diagrammatical view showing opening of the preheated air ports in three stages. Fig. 28 is a view similar to Fig. 2, but with a spiral vaned spreader in the nozzle and showing in detail a modified connection of the secondary manifold to the intake manifold. Fig. 29 is a front view of a secondary manifold attached as in Fig. 28, and Fig. 30 is a diagrammatical side view generally similar to a part of Fig. 1 and showing a modified form of hot spot arrangement.

The gaseous materials supplied to the engine intake between the throttle and the engine cylinders comprise hot exhaust gases, cooled exhaust gases, preheated air and cooled or atmospheric air. The sources of energy for supply of these gaseous materials comprise the intake suction or draft, the pressure and kinetic energy of the engine exhaust gases, made use of both for the introduction of the exhaust gases themselves and for aspiration of air, and air driving or blowing means, such as the customary radiator fan or other mechanical blower, or available wind velocity of the propelled device, as an automobile, airplane, etc., with respect to the surrounding atmosphere.

Reference character 10 designates a four-cycle internal combustion engine, 12 the intake manifold, shown as having two branches 12ª, 12ª, 14 the exhaust manifold, 15 the carburetor, 16 the throttle, which, as indicated in Fig. 1, has its axis arranged to extend lengthwise of the engine in order to distribute the fuel equally to both of the branches 12ª, 12ª of the intake manifold, piston 17, cylinder 18, cylinder head 19, combustion chamber 20, and spark plug 21. The four-cycle engine which is illustrated is of the L-head type, one of the valves 22 being shown. A hot spot chamber 24 for exhaust gas heating of a part of the intake manifold, is shown in Fig. 1 connected with an extension 26 of the exhaust manifold. This arrangement with continuous application of heat to the hot spot part of the intake manifold is particularly adapted for securing maximum economy and the most thorough completeness of combustion, but at some sacrifice of possible gain in maximum power and volumetric efficiency due to excess heat at wide open throttle. When the arrangement of Fig. 30 is resorted to, comprising the exhaust manifold 14' with the butterfly valve 23 for hot spot heating of the intake manifold 12 open or substantially open for partial throttle positions and butterfly valve 23ª interlinked therewith and closed, or substantially closed, at such times and with the reverse situation at and toward open throttle, there is a substantial improvement from the standpoint of power and volumetric efficiency. It is preferred to have the exhaust manifold 14 formed with a substantially Venturi-tube portion 28 just behind the last exhaust valve port to locally increase the velocity of the exhaust gases. Where a radiator is used, the engine has the usual cooling fan 30, and, as same should be as efficient as practicable for use with my invention, an airplane propeller type of fan is shown. The Sirocco blower sometimes used on air cooled engines will serve my purpose equally well.

The control apparatus is designated generally by reference character 32, and forms part of a by-pass connection between the exhaust and intake conduits. The device 32 further has provision for air supply and contains the preferably rotary metering valve 34 interconnected with the throttle 16 and automatically operated adjunctively to the turning of the throttle 16, as by the link 36.

The supply of exhaust gas is through the impact tube 38 having its open mouth directed against the flow in the exhaust conduit at the throat of the Venturi section 28, so that the exhaust gases are delivered through impact tube 38 with the full driving force of the main exhaust stream behind and driving them. The impact tube 38 is preferably fitted into a taper hole and bolted to the exhaust conduit at 40 and serves as the means for attaching device 32 to the exhaust conduit, being screwed on to the projecting neck 42 of the air preheating stove 44, containing the exhaust gas chamber 46, which is preferably of larger bore than the impact tube 38 in order to secure effective heat interchange and through which the exhaust gas is delivered at 45 to the rotary metering valve 34.

Stove 44 is provided with heat radiating fins 48, which extend into the air passage 50, surrounding stove 44. Air, warmed by the exhaust manifold and coming through the passage 52 in the split elbow-shaped bonnet 54, which surrounds the part of impact tube 38 projecting from the exhaust conduit, enters passage 50 by the port 56 and is delivered to the rotary metering valve 34 at 58. This part of the device is thoroughly insulated and preferably comprises the preferably cast shell 60 of generally cup form, having the opening 62 in its end 64, through which neck 42 of stove 44 extends, and is held from turning by the dowel pin 66. The outer wall of air passage 50 is formed by the inner one 68 of a pair of hollow cylinders 68, 70 inserted in the cylindrical cavity 72 of shell 60, and these cylinders and the shell 60 are recessed to provide the intermediate air spaces 74 and 76. Also the shell 60 is exteriorly recessed as shown at 78 and is enclosed by the cylindrical covering sleeve 80, which is preferably shrunk on to provide a third insulating air envelope 82. The jacket chambers 74 and 76 are connected by the hole 75, and hole 77 from chamber 76 gives communication from these chambers to pipe 92 leading to the engine intake. The partial vacuum induced during periods of relatively high intake depression improves the insulation obtained.

The preferably cast member 84 containing the metering valve 34 and forming the major part of the exhaust gas cooler is secured to shell 60, as by screws 86, the cooler being completed by still a third member 88 made separately for constructional reasons and secured to member 84 by screws 90.

The construction and operation of the metering rotor 34 will be set forth in detail below. It is, however, here to be noted that, in addition to controlling the exhaust gas and preheated air, it also serves to control the passage of cold or atmospheric air, and that it serves to control the passage of gases to the engine intake through the pipe 92 connected to device 32 at 94, either directly or through the cooler designated generally as 96.

When the exhaust gas is sent through the cooler 96 it travels out through the passage 98 having the inner and outer heat conducting and radiating fins 100, 102 and back through the return passage 104 containing the Venturi tube 106 and thence to pipe 92 at 94. The cold or atmospheric air is delivered to the rotary metering valve 34 from a blowing means of some kind, such as from behind the engine fan 30, and preferably is collected by the funnel 108 and delivered to the device 32 through the pipe 110 connected at 112 (Fig. 9) and after passing the metering valve 34 is sent through the pipe 114, around the bend therein, and is aspirated through the nozzle 116 located in the throat of the Venturi tube 106 by means of the exhaust gas traveling around said nozzle 116 through the Venturi tube passage 106', where it mixes with the exhaust gas and further lowers the temperature thereof. By using blower means for supply of cold air and also subjecting this air to an aspiration or drawing action of the exhaust gas, practically any desired quantity of cold air can be supplied and substantially any desired cooling of the exhaust gases obtained. The increase in oxygen concentration so obtained not merely offsets the diluent effect of exhaust gas, but enables more exhaust gas to be used than would otherwise be possible, with consequent increase of initial cylinder pressure and greater certainty of eliminating detonation. An air cleaner 117 (Fig. 1ª) may be arranged back of the funnel 108, if desired. By connecting a pipe 119 communicating with a hole 119ª through the throat of the Venturi tube 106 to a suitable device, such as a vacuum tank, I provide an efficient pressure depression for fuel feeding. Such connection may serve as the sole source of depression or partial vacuum for lifting fuel from a fuel supply tank, or it may be used in conjunction with and to supplement the action of the usual vacuum tank connection to the intake near the carburetor. Contrary to the action of such usual connection, the depression at 119ª increases with increase of the engine requirements for fuel supply.

I preferably make use of aspirating connections in delivering the modifying gases into admixture with the fuel and air mixture supplied by the carburetor, and I preferably make such delivery at the neighborhood of the connection of the intake manifold to the several branches leading to the engine cylinders, using a secondary manifold 118 for subdivision of the passage from pipe 92. The delivery is by means of nozzle 120 located centrally of the passage and directed with the gas flow toward the engine cylinder and, instead of using the simple nozzle arrangement, as shown in Fig. 3, I may insert a Venturi tube 122 or form the intake passage into a Venturi-like construction so as to secure the maximum aspirating effect (Fig. 2). By use of the secondary manifold 118, inequalities of distribution are minimized, and in traversing the hot spot section and the intake manifold branches in which it is brought into extensive contact with the air admitted therewith through the carburetor, the fuel absorbs heat in latent form and is partially vaporized prior to its complete vaporization by the direct central admixture therewith of the charge modifying gases supplied at the nozzles 120. The high turbulence and thorough admixing of the gases by the blast delivered centrally of the fuel and air stream through the nozzles 120 continues as the gases pass through the intake valves and into the engine cylinders. The gases issuing from nozzles 120 may be spread and further agitated by providing the spiral vaned spreaders 123, Fig. 28. The secondary manifold 118 may be secured in place by screws 119", the nozzles 120 being seated in taper recessed holes 121 formed in the intake manifold. See Figs. 28 and 29. When these parts are formed as in Figs. 2 and 3, they are preferably welded together.

The rotary metering valve 34 turns in a sleeve 124 and controls the gases passing therethrough by the extent of registration between ports formed in the sleeve and in the rotor 34. The inner wall of the sleeve 124 is preferably recessed in parts, as indicated at 124', thereby reducing friction and getting a close fit of rotor 34 alongside the ports formed in sleeve 124. A bushing 126, having ports which are substantially continuations of the ports in the sleeve 124, is preferably forced into the bore 128 of the member 84 in order to make the parts gas tight and to ensure a perfect fit of the removable valve and sleeve unit. When the main casting is of aluminum and the sleeve and rotor are of Monel metal, which is well adapted to withstand the heat without corrosion, the bushing is also preferably of Monel metal. The sleeve 124 is removably locked in place by screw 130 and contains bearings, preferably ball bearings 132, for the shaft extensions 134 and 136 of rotor 34. A coil spring 138 having one end fixed in bearing cover 140 and the other end fixed in split collar 142 adjustably clamped to rotor shaft extension 134 serves to facilitate initial adjustments, especially for idling, as well as to insure takeup of any slack or backlash in linkage connections to the throttle, and for returning the rotor to the closed or idling position when released.

In operation, control is by means of the crank 146 adjustably clamped to the shaft 136 of rotor 34 so as to obtain the proper angular relation between the crank and the rotor, and, as may be noted, two somewhat different positions are shown in Fig. 4 and in the assembly drawing Fig. 1. The crank 146 is operated by the link 36 by which it is interconnected with the throttle operating means, and adjustment for rotation of rotor 34 to correspond to the various throttle positions is made by varying the radial distance at which the split collar 148, in which the link 36 has its bearing, is clamped to the crank arm 146. The stop screws 150 and 152, provided for limiting closing movement and full throw movement, respectively, of rotor 34, are carried by the collar 153, which is fastened to shaft part 136 by the screw 153ª. Collar 153 turns with shaft part 136 and limits its movement by contact of stop screws 150 and 152 with the sides of lug 153ᵇ projecting from the bearing cover 153ᶜ. The angular position of collar 153 can be changed to suit any position in which lug 153ᵇ may be placed, as will be evident from a comparison of Figs. 1 and 4. Stop screws 150 and 152 are adjusted in consonance with adjustment of radial throw of collar 148 in or out on crank arm 146, as obviously, for example, increased distance between stops 150 and 152 will call for a corresponding inward radial adjustment of collar 148. Adjustment of stop screw 150 for rotor closing will be referred to later in connection with control of admission of exhaust gas at engine idling.

The adjustment of preheated air for engine idling is made exteriorly to the sleeve 124 and independently of the adjustment for hot exhaust gas for idling. For example, such adjustment may be secured by means of the needle valve 154, which may be turned by a screw driver applied to its exposed outer end and locked with the lock nut 156 and serves to regulate the extent of opening of the hole 157 in sleeve 124.

The provision made in that part of rotor 34 remote from the crank arm 146 for admission of atmospheric air does not come into effect until after the rotor movement is somewhat advanced, and it will be referred to after first describing the rotor portion nearer the crank arm 146, and which contains the ports for control of preheated air and exhaust gas.

The exhaust gas enters the mouth of the impact tube 38, having its open mouth directed against the flow in exhaust conduit 14, in order to get the full effect of the velocity and pressure of gas flow in the exhaust conduit, and passes through the elbow shaped impact tube 38 and the stove or heater 44 and to the port 45 controlled by the rotor 34. Port 45 is preferably of elongated rectangular form as shown in Figs. 25 and 26. The exhaust gas port 158 in the rotor 34, which coacts with port 45, is of irregular formation to provide the exhaust gas required at the different positions of the rotor. The leading portion 158ª of port 158 supplies exhaust gas at engine idling. Said portion 158ª is comparatively long and narrow and its total area is made quite small because the initial cylinder pressure desired upon idling is low, and the suction is very considerable because of the very considerable depression of pressure in the intake manifold at idling, with the throttle substantially closed off. By adjusting the stop screw 150, the retracted position of the rotor 34 can be adjusted to control the extent of registration of the narrow idling hot exhaust gas port 158ª with the port 45 and thereby regulate the quantity of exhaust gas supplied for engine idling. This regulation can be performed very closely and accurately. The width only of the narrow slot 158ª is changed by such adjustment, while its length is not changed, so that the quantity of hot exhaust gas for idling can be controlled by a very slight adjustment of screw 150. This will be plain from Fig. 25ª, which shows the condition when the retracted position of the rotor is set so that only about one-half of the full area of idling port 158ª is open by being in register with port 45. The cross-hatched part of port 158ª in Fig. 25ª is the opened portion, and the same schematic showing is adopted in Figs. 25, 26 and 27.

Upon turning the rotor, the hot exhaust gas, at first supplied through the idling opening 158ª only, is gradually increased by the gradual coming of the additional part 158ᵇ of port 158 into registration with port 45, but it is to be noted that in determining the size and shape of the port openings, allowance must be made for the fact that the quantity of hot exhaust gas passed through the ports depends, not only upon the size of opening, and upon the exhaust gas pressure, but also on the depression (drop below atmospheric pressure) in the intake manifold, and this drop diminishes rapidly as the rotor and throttle are opened.

At and toward full load with substantially wide open throttle and with a corresponding advance of the rotor, accompanied by increase in quantity and velocity of the exhaust gas in the exhaust gas conduit, the pressure and kinetic energy of the exhaust gas become material factors in driving hot exhaust gas through the hot exhaust gas ports 45, 158, and this factor, as well as the clearance volume and compression ratio of the engine and the tendency to increased detonation with increase of compression ratio, have a determining influence on the extent of hot exhaust gas port opening, or, stated otherwise, the extent of registration of ports 45 and 158. The cooling of the exhaust gas at such times before it is delivered to the intake and the aspiration of atmospheric air thereby also affect the best size of opening, as also such drop in pressure as there is in the intake manifold, and perhaps other items. Among these, however, the tendency to detonation has a largely controlling influence and in general the opening for passage of exhaust gas at full load may be reduced as compared with the opening for somewhat smaller load in the case of an engine of low compression ratio, say 4¾:1, and still pass sufficient inert exhaust gas to suppress detonation without loss of power and of capacity for rapid acceleration, whereas with a higher compression engine of, say, 6:1 compression ratio, a relatively larger opening for exhaust gas is necessary to suppress detonation, which would be more marked in such high compression engine. Consequently Fig. 25 shows the arrangement for a low compression engine of say 4¾:1 compression ratio, with the portion 158$^c$ of port 158 coming into registration with port 45 at full load, and of substantially reduced area as compared with the part 158$^b$, which comes into registration with port 45 at an earlier stage of rotor turning.

Fig. 26 shows the portion 158$^e$ (corresponding to portion 158$^c$ just referred to) provided for a high compression engine of say 6:1 compression ratio, and of the full width of port 45, thus providing all necessary inert exhaust gas to suppress detonation in such higher compression engine. By using the exhaust gas to aspirate air and by utilizing for aspiration air driven in by the fan, I can supply sufficient air to obtain the necessary balance and avoid loss of power by supply of unduly large proportions of the inert exhaust gas. By adjusting stop screw 152 controlling the extreme throw of the rotor 34 and making corresponding adjustment of slide 148, the port opening produced at full load positions may be varied to suit requirements.

The air supplied is balanced with the inert exhaust gas to secure optimum results. At idling, the air, preheated by passing relatively slowly through the elbow bonnet 54 and the casing passage 50 in contact with the hot stove 44 and heat radiating fins 48, is delivered to the rotor 34 through the hole 157 in the sleeve 124, the extent of hole opening being controlled by the externally adjustable needle valve 154, and passes through the rotor slot 160, forming a forward extension of the main preheated air port 162 (Fig. 27). Thus by means of needle valve 154 and stop screw 150, the preheated air for idling and the exhaust gas for idling may be balanced to secure best results.

The metering characteristics of many carburetors are such that when the engine is under very light loads the charge requirements are sensitive to such an extent that any additional air that is introduced must be metered with extreme care, and this is especially the case when the throttle begins to open just after the idling position. Such accurate metering is accomplished in the illustrated structure by making the advance edge 164 of preheated air port 162 of the rotor of substantially spiral or angular formation, as shown in dotted lines in Fig. 27, and providing in the sleeve 124 the series of small holes 166 substantially parallel to the rear edge 168 of preheated air port 162, said edge 168 being along an elemental line of the cylindrical rotor 34. It will be seen that, at and just after idling, only the hole 157, made adjustable by needle valve 154, is open for passage of preheated air through slot 160 and that upon the first turning of the rotor 34 the slanting forward edge 164 of port 162 gradually and progressively uncovers the small air passages 166, as is indicated in black shading in the middle and lowermost parts of Fig. 27, and that not until the rotor is turned through a further angle are the larger preheated air holes 170 of the second row (except idling air hole 157, which is preferably in this row) uncovered by registration with the rotor port 162. In practice a surplus of holes 166, 170 is provided, and if too much preheated air is passed, the excess holes are closed off, as by insertion of screw plugs provided for the purpose, some or all of the holes being threaded for this purpose, as shown in Fig. 23. The rotor 34 and sleeve 124 are readily removable to permit such changes by taking out the single screw 130. Still further turning of the rotor closes off the passages for preheated air. See Fig. 24. The hole closed by screw 171 is provided for flushing the rotor parts with a cleaning solution or lubricating medium.

During the earlier stages of advancement of the rotor 34, the preheated air and hot exhaust gas admitted as described passes direct from the cavity 172 of rotor 34 to the intake through rotor port 174 and passage 176 (Fig. 23). As the rotor is further advanced, rotor port 174 passes away from passage 176 and opens up communication from the rotor cavity 172 to the exhaust gas passage 178 leading to cooler 96, in which the temperature of the exhaust gas lowered by radiation of heat from the cooler fins 102. The travel of this exhaust gas is through the outgoing passage 98 in the cooler and back through the return passage 104, the reversal being by way of the smoothly sweeping return bend 103, so as to produce the minimum retardation of flow of the gases. On the return the exhaust gas is passed through the Venturi tube 106, whereby inflow of atmospheric air is induced as presently to be described, the exhaust gas being further effectually cooled by the mixture of cold air therewith, and from the return passage 104, the gases are delivered through the conduit 92 to the engine intake.

The atmospheric air is admitted to the cavity 180 in that part of rotor 34 furthest removed from the crank 146, being separated from the cavity 172 by the partition or web 182, which also serves to impart added rigidity and strength to the hollow rotor 34. Admission is through the passage 184 and rotor port 186 to cavity 180, and thence through rotor port 188 and passage 190, and thence through the pipe 114 with the easily sweeping return bend 192 and return pipe portion 194 to and out of the induction nozzle 116. The nozzle 116 is disposed in such relation to the region of highest velocity and greatest depression of pressure in Venturi tube 106 that the maximum inflow of atmospheric air and consequent maximum cooling of the exhaust gas is obtained when port 186 is in register with inlet 184. This port opening is begun to be made as the preheated air port 162 and outlet passage 176 are closing, so that a smooth transition from hot exhaust gas and hot air is made to cooled exhaust gas and atmospheric air supplied to the engine intake.

The atmospheric air is preferably taken from a source of air under pressure or in movement, and may conveniently be air driven into the funnel 108 by the fan 30. Fig. 9 shows the rotor positions and port openings for the greatest advance position of the rotor 34 and it will be seen that at and toward such rotor positions the supply of atmospheric air is driven toward the engine cylinders along with the inert exhaust gas by the combined effects of the blower and of aspiration by the exhaust gas, and full cylinder charging obtained without any extra moving parts or expenditure of energy, such as is incident to supercharging through the carburetor with a Roots blower or the like. I may, however, make use of a special air blower or compressor, if desired.

The delivery of the gases to the intake is preferably through the secondary manifold 118 connected to the intake branches as near as practicable to the intake valve ports and is in the direction of gas flow to the cylinders, preferably through the aspirating nozzles 120 with or without the provision of a surrounding Venturi tube 122, as shown in Figs. 2 and 3 respectively. With such arrangement effective full cylinder charging can be obtained, and any tendency toward reversal of flow toward the carburetor is avoided. The secondary manifold assists materially in securing uniform distribution to the several cylinders.

With combustion control by forming cylinder charges as described the combustion chamber walls and piston head are permanently substantially free from so-called carbon deposits and it, therefore, becomes possible to make practical and continued use of irregularly surfaced combustion chamber walls and piston heads adapted to create turbulence and to deflect and break up pressure waves.

I have shown in Figs. 1 and 7 the head 200 of piston 17 provided with a substantially helicoidal projection 202 adapted when the piston is at maximum elevation to extend upwardly (using the language of the vertical engine) into the combustion chamber 20, and also a substantially helicoidal projection 204 extending downwardly in the ceiling of the combustion chamber 20 substantially opposite the member 202, and with the opening for the spark plug 21 in the center of projection 204. These projecting members presenting spirally arranged substantially flat surfaces connected by substantially vertical or riser surfaces are adapted to produce turbulence on intake and compression stroke and to secure thorough admixture of fuel and charge gases and quick spreading of the ignition flame, and by breaking up pressure waves and by providing additional cooled surface to conduct away excess heat, to prevent detonation and preignition. Carbon accumulates on such surfaces, however, in an ordinary engine. It is when, and so far as I am aware, only when they are used in combination with my hereinbefore described apparatus for combustion control, with resulting freedom from carbon deposits, that these and other irregularly shaped combustion chamber and piston head surfaces adapted to produce like results have their highest utility and can be used continuously in an internal combustion engine.

To briefly review the operation: At idling and low loads and with but partial cylinder filling, the draft created by downward piston movement on intake stroke furnishes the major part of the energy for drawing in the charge material. The atomizing air and fuel are taken in through the carburetor and are passed through a hot walled zone to partially vaporize the fuel and this fuel and air stream passes through the branches of the intake manifold until it again divides into the passages to the cylinder intake valve ports, in which region the nozzles 120 from the auxiliary manifold 118 discharge into the center of this fuel and air stream the hot automatically metered mixture of hot exhaust gas and preheated air which is supplied through the rotor 34, and at the high temperature supplied the fuel is thoroughly vaporized and the temperature of the charge is very materially raised by the time it enters the cylinder.

At heavy-load, wider-open-throttle positions, the conditions are changed so that the exhaust gases after passing through the meter rotor 34 are first sent through the cooler and then aspirated and become admixed with and cooled by atmospheric air, which is driven into the aspirator by the fan 30 and this mixture of cooled exhaust gas and atmospheric air is ejected at nozzles 120 of manifold 118 into the fuel and air stream, and an aspirating effect imparted to this stream. The charge components at this stage are driven toward the intake conduit and are not so dependent, as at partial throttle openings, upon intake suction for their introduction into the intake conduit.

Exhaust gas analyses made both of the exhaust gas generally from the exhaust conduit and from individual cylinders, without and with my invention for purposes of comparison, show that a much more complete type of combustion is obtained with my invention, with practically total absence of carbon monoxide at idling and a marked improvement in distribution to the individual cylinders.

This application is in part a continuation of my application Serial No. 64,522 filed October 24, 1925, and of my application Serial No. 85,450, filed February 2, 1926, renewed September 10, 1929.

The scope of my invention is defined in the following claims.

I claim:

1. In an internal combustion engine, a cooler, valved means for supplying exhaust gas of the engine to the intake conduit either direct or through the cooler, means for aspirating air into admixture with the exhaust gas when the latter is passed through the cooler, and means for driving the air into the aspirating means.

2. In an internal combustion engine, a bypass conduit extending from exhaust conduit to intake conduit, air aspirating means in said bypass and said bypass conduit being branched adjacent to the intake manifold and terminating in a plurality of nozzles discharging separately into the intake manifold substantially close to the intake valve ports in the direction of gas flow toward the engine cylinders.

3. In an internal combustion engine, hot air supply means, cool air supply means, exhaust gas supply means and means interconnected with the throttle to automatically introduce exhaust gas and hot air into the inlet manifold over the throttle at relatively low throttle openings and to admit exhaust gas with cool air at higher throttle openings.

4. The combination in an internal combustion engine, of an exhaust gas conduit connected with the exhaust manifold, an exhaust gas cooler, and valve controlled means for sending the exhaust gas from said conduit direct to the engine intake manifold or for sending it thereto through the cooler.

5. The combination in an internal combustion engine, of an exhaust gas conduit leading from the exhaust manifold, an exhaust gas cooler, valved means for sending exhaust gas from said conduit to the engine intake either direct or through the cooler, and means for admixing air therewith in said cooler.

6. In an internal combustion engine, means for supplying hot air, means for supplying cold air, means for supplying hot exhaust gas, means for supplying cooled exhaust gas, and valved means for controlling the quantity and proportion of said gaseous materials and supplying same to the fuel-air stream going to the engine cylinders.

7. In an internal combustion engine, means for supplying exhaust gas to the engine intake above the throttle, and means for selectively admixing hot or cold air therewith.

8. In an internal combustion engine, means for supplying exhaust gas hot from exhaust to intake, means for supplying exhaust gas at reduced temperature to intake, and means interconnected with the throttle for shifting from one supply to the other.

9. In an internal combustion engine, means for supplying exhaust gas hot from exhaust to intake, means for supplying exhaust gas at reduced temperature to intake, and means for shifting from one supply to the other.

10. In an internal combustion engine, a carburetor, a bypass from exhaust to intake over the throttle, means for supplying air to the bypass, a valve in the bypass interconnected with the throttle, and independent adjustments for supply of exhaust gas and air at idling positions of the throttle and said valves.

11. In means for supplying exhaust gas and air to the fuel and air stream of an internal combustion engine above the carburetor, a ported valve rotor, a ported bored member in the bore of which the valve rotor turns, means for varying a port opening in the member for controlling the air supply for idling, and means for adjusting the rotor position with respect to the member for controlling the exhaust gas supply for idling.

12. In an internal combustion engine, a bored member having a port therein for idling air, means exterior to the bored member for varying the opening of said port, a rotor turning in the bore of said member, and means having adjustment by change of relative positions of the rotor and member for supplying exhaust gas for idling in regulable quantities.

13. In apparatus for supplying exhaust gas and air to the intake of an internal combustion engine above the carburetor and throttle, a bored member and a rotor turnable in said bore, the member and rotor having ports adapted to register at idling for passage of exhaust gas and for passage of air respectively, means associated with the member for adjusting the extent of opening of the member port for idling air, and the extent of opening of the ports for exhaust gas at idling being regulated by position of the rotor with respect to the member.

14. In apparatus for supplying exhaust gas and air to the intake of an internal combustion engine above the carburetor and throttle, a sleeve having a port for air for engine idling, a needle valve exterior to the sleeve for regulating the extent of opening of said port, said sleeve also having a port for exhaust gas for idling, a rotor mounted to turn in the sleeve and having ports adapted to register with the aforementioned ports, the rotor being adjustable with respect to the sleeve to regulate the extent of registration of the sleeve and rotor ports for passage of exhaust gas for idling.

15. In an internal combustion engine, means for adding exhaust gas and air to the fuel and air stream from the carburetor to form modified charges for the internal combustion engine cylinders, and means for controlling the temperature of the added exhaust gas and air so that same are relatively hot for relatively low quantity cylinder charges and relatively cool for relatively high quantity cylinder charges.

16. In an internal combustion engine, means operable during partial throttle openings below the detonation point for supplying to the engine intake conduit above the throttle hot exhaust gas and hot air at temperatures sufficient to gasify the fuel and materially raise the charge temperature over and above what is required for gasification of the fuel, and means for supplying cooled exhaust gas and cold air to the intake conduit at wider throttle openings.

17. In an internal combustion engine, means for forming a fuel and air stream, a throttle for the fuel-air stream on its way to the engine cylinders, means beyond the throttle for heating the fuel and air stream, and means beyond said heating means for delivering to the fuel-air stream a mixture of exhaust gas and air which is relatively hot for cylinder charges of relatively low quantity and relatively cold for cylinder charges of relatively great quantity.

18. In an internal combustion engine, the combination with means for delivering exhaust gas and air to the intake conduit above the throttle, of means for exhaust gas heating of the intake manifold prior to delivery of the additional gases thereto, and means for directing the exhaust gas so as to go through or to avoid traversing said heating means.

19. In an internal combustion engine, a bypass from exhaust to intake, means therein for aspirating air into admixture with the exhaust gas at substantially the higher portion of the load range of the engine, means for driving the air into the aspirating means, and means for shutting off the air supply to the aspirating means over the lower portion of the load range.

20. Means for delivering supplemental charge gases to the intake manifold of an internal combustion engine, comprising means for mixing exhaust gas and air, a secondary manifold communicating therewith and nozzles delivering from said secondary manifold to the intake manifold of the engine substantially close to the intake valve ports.

21. In a charge supplementer for internal combustion engines, chambered rotary means for metering air and exhaust gas into admixture in the interior thereof and for remetering the mixture thereof upon passing out of said chamber.

22. An apparatus for modifying the charge material supplied to an internal combustion engine by the carburetor, comprising a bypass from exhaust to intake beyond the throttle serving to continuously deliver exhaust gas to the intake throughout the load range of the engine, means for conducting air into the bypass into admixture with the exhaust gas for delivery therewith to the intake, and means operated adjunctively to throttling for controlling the temperature of the air passing into admixture with said exhaust gas to vary the temperature of the exhaust gas.

23. In apparatus for modifying the charge material supplied to an internal combustion engine comprising a bypass from exhaust to intake, means for admitting heated air to said bypass, means for admitting cooler air to said bypass, and means for closing one of said air admitting means as the other thereof opens and vice versa.

24. In charge supplementing apparatus for internal combustion engines, a by-pass from exhaust to intake, an air injector in said passage, and a valve for exhaust gas between exhaust conduit and injector of maximum opening in excess of the exhaust gas passage of the injector.

25. An interval combustion engine comprising an exhaust gas bypass from exhaust to intake, means for supplying preheated and cool air into admixture with the exhaust gas, and means for controlling the passage of exhaust gas and air including a movable member controlling the extent of opening of the exhaust gas bypass and having a passage for conducting air from certain of said air supplying means into said bypass.

26. An internal combustion engine comprising an exhaust gas bypass from exhaust to intake, means for supplying preheated air and cool air for conduction into said bypass, and means for controlling the passage of exhaust gas through said bypass and of air into admixture therewith including a movable member controlling the extent of opening of the exhaust gas bypass and serving to conduct both the preheated air and cool air into admixture with the exhaust gas.

27. An apparatus for modifying the charge material supplied to an internal combustion engine comprising a bypass from exhaust to intake, means for admitting heated air to said bypass, means for admitting cooler air to said bypass, and means for controlling the passage of exhaust gas through said bypass and of air through said several air admitting means to said bypass.

28. An apparatus for modifying the charge material supplied to an internal combustion engine comprising a bypass from exhaust to intake, means for admitting heated air to said bypass, means for admitting cooler air to said bypass, and means for controlling the passage of exhaust gas through said bypass and of air through said several air admitting means to said bypass; said last named means closing one of said air admitting means when the other thereof opens and vice versa without shutting off the passage of exhaust gas to the intake.

29. An apparatus for modifying the charge material supplied to an internal combustion engine comprising a bypass from exhaust to intake, means for admitting cool air to said bypass, and means operated adjunctively to engine throttling for controlling the passage of exhaust gas through said bypass, and for closing the cool air admitting means over the lower portion of the load range, whereby to supply exhaust gas in a heated condition over the lower portion of the load range and in a cooler condition over the higher portion of the load range.

30. An apparatus for modifying the charge material supplied to an internal combustion engine comprising an exhaust, an intake, a throttle, a bypass from exhaust to intake, means for admitting heated air to said bypass, means for admitting cooler air to said bypass, and throttle actuated means for controlling the passage of exhaust gas through said bypass, and of air through said several air admitting means to said bypass; said throttle actuated means closing one of said air admitting means when the other thereof opens and vice versa.

31. In apparatus for modifying the charge material supplied to an internal combustion engine comprising exhaust and intake, a bypass from exhaust to intake, means for supplying heated air to said bypass, means for supplying cooler air to said bypass, and a valve member common to said bypass and said several air supplying means for controlling the passage of exhaust gas through and of heated and cooler air into said bypass.

32. In an internal combustion engine comprising exhaust and intake conduits, a bypass member from exhaust to intake comprising a casing having at one end wall separated passages for hot exhaust gas and air respectively and serving for transfer of heat from the exhaust gas to the air, and having at its opposite end an exhaust gas cooler, and a valve intermediate of the heat transfer means and the cooler for controlling the passage of the exhaust gas.

33. In an internal combustion engine, means for supplying gaseous additions including exhaust gas and air to the intake conduit, and a valve for controlling the passage of said exhaust gas and said air, said valve including relatively movable members having registered ports, and certain of said registering ports including a plurality of holes adapted to be plugged to adjust the port area of the holes exposed through the port registering therewith, and to regulate the amount of gaseous additions passing through said ports in the registering position thereof.

34. In an internal combusion engine, means for supplying exhaust gas to the intake conduit, means for supplying air to said first named means, said last named means being disposed in heat conducting relation to said first named means for heating the air, a valve for metering said exhaust gas and said air prior to admixture thereof, and including registerable ports adapted to communicate with said heated air supplying means during periods of high depression in said intake conduit, and means for adjusting the relative areas of said ports whereby to more closely regulate the amount of heated air admitted to the intake conduit when said ports are in registerable position.

35. A heat control and valve mechanism for forming a part of a bypass from the exhaust to the intake conduit of an internal combusion engine, comprising heat transfer means in which heat of exhaust gas serves to heat air, means for cooling exhaust gas, and a rotary valve in said bypass for controlling said first and second means adapted at part turn to admix hot air with hot exhaust gas for supply to the engine intake, and on further turning to cut off the hot air and render said cooling means effective on said exhaust gas to reduce the temperature thereof as the same passes to the engine.

36. In an internal combustion engine, an exhaust conduit, an intake conduit, a bypass from the exhaust to the intake conduit, means for admitting air to said bypass, and a hollow valve member movable disposed within said bypass intermediate said air admiting means and said bypass and serving to control the passage of exhaust gas therethrough to said intake conduit, said valve member being adapted to communicate in certain of the positions thereof with said air admitting means to permit of the passage of air to said bypass.

37. In charge supplementing apparatus for internal combustion engines, a bypass from exhaust to intake, an exhaust gas to air injector in said bypass, and valvular means for controlling the passage of air to said injector to reduce the passage thereto at low engine loads and to provide a maximum opening in excess of the injector air opening at relatively high engine loads, whereby to permit of free passage for ample air into inductive relation to the exhaust gas under the last mentioned load conditions.

38. In a charge supplementer for internal combustion engines, means for supplying exhaust gas to the intake, an injector therein having an air discharge orifice subject to the inductive action of the exhaust gas, whereby air is injected into the intake by means of the kinetic energy of the exhaust gas into the stream to the engine cylinders, and means for controlling the passage of exhaust gas and air to said injector.

39. In a charge supplementer for internal combustion engines, means for supplying exhaust gas to the intake, an injector therein having an air discharge orifice subject to the inductive action of the exhaust gas, whereby air is injected into the intake by means of the kinetic energy of the exhaust gas into the stream to the engine cylinders, and means for controlling the passage of exhaust gas and air to said injector, said controlling means at substantially full load passing maximum air subject to substantially maximum inductive effect of said exhaust gas.

40. In an internal combustion engine, an exhaust conduit, an intake conduit, a bypass from said exhaust conduit to said intake conduit, an air conduit extending along a portion of said bypass for heating the air and communicating with said bypass, means for supplying cooler air to said bypass, and valvular means for controlling the passage of exhaust gas through said bypass and the admission of the heated and cooler air thereto; said valvular means having a port adapted to open in certain of the positions thereof to admit heated air into admixture with said exhaust gas, and to shut to exclude said heated air in other of the positions thereof, and a port for admitting cooler air to said exhaust gas as said heated air port closes; and said heated air port including means for adjusting the port area thereof to regulate the amount of heated air admitted when the port opens.

41. The combination with an internal combustion engine, means for supplying thereto a mixture formed from air and liquid fuel, said engine having an exhaust manifold, of means for modifying the character of said mixture comprising means for utilizing the kinetic energy of the exhaust gases in said exhaust manifold for adding exhaust gases to said first named mixture, and means for varying the temperature of said exhaust gases prior to the addition thereof to said air and fuel mixture.

42. The combination with an internal combustion engine, means for supplying thereto a mixture formed from air and liquid fuel, said engine having an exhaust manifold, of means for modifying the character of said mixture comprising means for utilizing the kinetic energy of the exhaust gases in said exhaust manifold for adding air to said first named mixture, and means for varying the temperature of said air prior to the addition thereof to said air and fuel mixture.

43. The combination with an internal combustion engine, and means for supplying thereto a mixture formed from air and liquid fuel, of means for modifying the character of said mixture comprising means for adding to said mixture a mixture of exhaust gases, expelled from said engine, and air, and means for decreasing the heat of said last named mixture when the load on said engine increases.

44. The combination with an internal combustion engine, means for supplying thereto a mixture formed from air and liquid fuel, and means for controlling the rate at which said mixture is supplied to said engine, of means for modifying the character of said mixture comprising means for adding to said mixture a mixture of exhaust gases, expelled from said engine, and air, at a rate dependent upon the position of said controlling means, and means for decreasing the heat of said last named mixture when the load on said engine increases.

45. The combination with an internal combustion engine, having an intake manifold and exhaust manifold, means for forming a mixture from air and liquid fuel and conducting it to said intake manifold, and a throttle for controlling the passage of said mixture to said intake manifold, of means for modifying the character of said mixture comprising means for withdrawing exhaust gases from said exhaust manifold and mixing said gases with air and delivering said mixture of gases and air into said intake manifold, and means for materially lowering the temperature of said mixture of gas and air between positions of said throttle when detonation would ordinarily occur and full load positions of said throttle.

46. The combination with an internal combustion engine, having an intake manifold, an exhaust manifold, a throttle, and a carburetor for supplying a mixture of air and liquid fuel to said intake manifold past said throttle, of means for modifying the character of the mixture produced by said carburetor comprising a conduit connecting the exhaust manifold with the intake manifold, valve means for controlling the passage of a mixture of air and exhaust gases from said exhaust manifold through said conduit to said intake, said valve means comprising means, connected to operate in correlation with said throttle, for permitting the passage of increasing quantities of said mixture of air and exhaust gases to said intake manifold from light-load position to full-load position of said throttle, means for heating the admitted air between the light-load position of the throttle and the position of the throttle at which detonation might ordinarily occur, and means for cooling the mixture of air and exhaust gases between the last mentioned position of the throttle and the full-load position.

47. An internal combustion engine comprising an exhaust gas bypass from exhaust to intake, said bypass being enlarged at one region to form substantially a chamber having an outlet, and an air conduit extending through said chamber and joining up with said outlet.

48. An internal combustion engine comprising an exhaust gas bypass from exhaust to intake, a tubular air passage, the exhaust gas bypass having a portion substantially surrounding the air passage, and means beyond the surrounding portion for bringing the air and exhaust gas into admixture.

49. In a charge supplementing apparatus for internal combustion engines, a conduit for conveying gases from the engine into the intake, a cold air conduit having a discharge end extending into said first named conduit in spaced relation to the wall thereof and forming therewith an injector having a relatively constricted annular orifice for the passage of the engine gases past the discharge end of the cold air conduit, said annular orifice being reduced in cross-sectional area appreciably compared to that of the discharge orifice of the air nozzle, whereby to permit of the use of a relatively small quantity of engine gases at relatively high velocity at the discharge end of said air conduit for injecting appreciably larger quantities of air into the intake.

50. In an internal combustion engine, an exhaust, an intake, a bypass from exhaust to intake for diverting a portion of the exhaust gas in a highly heated condition into the intake, said bypass including a portion of ample passage extending from the exhaust, and a portion of reduced passage forming a continuation of the first portion, and a cold air conduit having a discharge end extending into said reduced passage and forming an annular orifice for the passage of the exhaust gas in inductive relation to said discharge end.

51. In a charge supplementing apparatus for internal combustion engines, a bypass from exhaust to intake having a relatively constricted portion, a cold air conducting member having a discharge end extending into said constricted portion and forming therewith an annular orifice for the passage of exhaust gas, the air discharge orifice being appreciably larger than said annular orifice, whereby to reduce the temperature of the exhaust gas upon admixture thereof with air and permit of the injection of a large quantity of air by an appreciably smaller quantity of exhaust gas.

52. In a charge supplementing apparatus for internal combustion engines, means for conveying gases from the engine to the engine intake, a venturi in said conveying means, and a cold air nozzle having the discharge end thereof received within said venturi adjacent to the constriction thereof and forming therewith a relatively constricted annular orifice for the passage of the engine gases in inductive relation to said air discharge end.

53. In a charge supplementing apparatus for internal combustion engines, an intake conduit having a venturi therein for the passage of the main gaseous medium, means for conveying gases from the engine to the engine intake through said venturi, a relatively constricted injector portion in said conveying means, and an air nozzle having the discharge end thereof received within said injector portion and forming therewith a relatively constricted annular orifice for the passage of the engine gases for injecting air therewith into the intake, the passage of the injected air and engine gases through said first mentioned venturi serving to augment the flow of said gaseous medium towards the engine cylinders.

54. In a charge supplementer for internal combustion engines, means for supplying exhaust gas to the engine cylinders with the fuel, means for supplying preheated air to said exhaust gas supplying means, means for supplying cold air into admixture with said exhaust gas, and means for controlling the passage of exhaust gas and preheated air into admixture with each other under part load conditions and of cold air and exhaust gas into admixture with each other as the load increases, said exhaust gas supplying means and said cold air supplying means at the passage openings thereof for heavy load conditions being dependent upon the kinetic energy of the exhaust gas for varying the supply of the gases through said openings.

55. In a charge supplementing device for internal combustion engines, a bypass for hot exhaust gas from exhaust to intake, a cold air nozzle having a discharge and extending into and disposed in spaced relation to the wall of said bypass and forming therewith an injector having a relatively constricted annular orifice for the passage of the exhaust gas past the discharge end of the air nozzle, said annular orifice being of reduced cross-sectional area compared to the cross-sectional area of the discharge orifice of the air nozzle, and the portion of said bypass beyond said discharge orifices being of relatively reduced size compared to the size of the portion of the exhaust gas bypass at the opposite side of the injector, whereby to permit of the use of a relatively small quantity of exhaust gas at velocities augmented because of shrinkage due to the cooling of the exhaust gas by the air for injecting appreciably larger quantities of air into the intake.

56. In an internal combustion engine, an exhaust, an intake, a throttle, a bypass from said exhaust to said intake above the throttle, an injector in said bypass having an air discharge orifice subject to the action of the exhaust gas stream for injecting cold air into the intake, and means for controlling the passage of cold air to said injector, and operated adjunctively to throttling for shutting off the supply of cold air to the injector when the intake depression is relatively high.

57. In an internal combustion engine, an exhaust, an intake, a throttle, a bypass from exhaust to intake above the throttle, means for supplying preheated air to the bypass, means for supplying cold air thereto, an injector in said bypass, and means controllable to deliver exhaust gas and preheated air to the intake principally by intake suction when the intake depression is relatively high, and to deliver cold air and exhaust gas to the intake principally by the kinetic energy of the exhaust gas and by the inductive effects thereof upon the air at said injector when the intake depression is at and towards its least values.

58. In an internal combustion engine consuming volatile liquid fuel, a bypass for exhaust gas from exhaust to intake, means for admixing heated air with the bypassed exhaust gas during a predetermined lower power range, and a cold air injector for cooling the exhaust gas supplied during the remaining portion of the power range.

59. In charge supplementing apparatus for internal combustion engines, a by-pass from exhaust to intake, an air injector in said passage, a valve for exhaust gas between the exhaust conduit and the injector of maximum opening in excess of the exhaust gas passage in the injector, an air conduit leading to said injector, and a valve in said air conduit of maximum opening in excess of the air passage in the injector.

60. In charge supplementing apparatus for internal combustion engines, a by-pass from exhaust to intake, valve means for metering the exhaust gas and sending same through one or another of two reuniting branches of the by-pass, means for admixing hot air with the exhaust gas when sent through one branch, and means for admixing cold air therewith when sent through the other branch.

61. In charge supplementing apparatus for internal combustion engines, a by-pass from exhaust to intake, an exhaust gas to air injector in the by-pass, valve means for passage of exhaust gas between the exhaust conduit and the injector of maximum opening in excess of the exhaust gas opening in the injector and serving at part opening to meter the exhaust gas and on wider opening merely as a gate therefor, the injector exhaust gas passage taking on the metering function at such wider valve openings, and a cooler for the exhaust gas between the valve and the injector.

62. In an attachment for insertion between the intake and exhaust conduits of an internal combustion engine, a stove member apertured for passage of exhaust gas and having extensive heat radiating surfaces on its exterior wall, an insulated hollow member surrounding said stove and providing therebetween a passage for air to be heated by the stove, a cooler for the exhaust gas, and a valve between the stove and the cooler.

63. A heat transfer and mixing device having an exhaust gas inlet and inlets for cold air and for air to be preheated and a single outlet to communicate with the engine intake above the throttle, heat transfer means for transfer of heat between the exhaust gas and the air to be preheated, a cooler for exhaust gas, and a valve mechanism arranged between the heat transfer means and the cooler, said valve mechanism serving in its various positions to mix preheated air with exhaust gas and discharge same through the outlet, or to cut off the preheated air and admit cold air and exhaust gas to the cooler and to discharge same through the outlet.

64. In an internal combustion engine, means for supplying different gaseous additions to the intake conduit, and a valve for controlling said gaseous additions; said valve having a plurality of inlet ports for said several gaseous additions, a common outlet port for the egress of said several additions entering through said inlet ports in certain of the positions of said valve, and an outlet port for the egress of certain of said gaseous additions entering certain of said inlet ports in other of the positions of said valve when the other of said inlet ports is in closed position.

65. In an internal combustion engine, an intake conduit, a heat exchange member, and a portion including an insulating chamber surrounding said heat exchange member; said chamber being in communication with the intake conduit, whereby to subject the gases within said chamber to the action of the intake depression for effecting the evacuation of said chamber.

66. In an internal combustion engine, an exhaust conduit, an intake conduit, an exhaust gas heater intermediate said conduits having a passage for the exhaust gas therethrough, a wall portion surrounding said heater in spaced relation thereto and providing therebetween a passage for the air to be heated, a wall portion surrounding said last named wall portion in spaced relation thereto and providing therebetween an insulating space surrounding said exhaust gas and air passages, and means for admixing said exhaust gas and said heated air beyond said heater for delivery thereof to the intake conduit in a heated condition.

67. In an internal combustion engine, an exhaust conduit, an intake conduit, an exhaust gas heater intermediate said conduits having a passage for the exhaust gas therethrough, a wall portion surrounding said heater in spaced relation thereto and providing therebetween a passage for the air to be heated, a wall portion surrounding said last named wall portion in spaced relation thereto and providing therebetween an insulating space surrounding said exhaust gas and air passages; said space being in communication with the intake conduit to subject the gases within said space to the action of the intake depression for effecting the evacuation of said space, and means for admixing said exhaust gas and said heated air beyond said heater for delivery thereof to the intake conduit in a heated condition.

68. A device of the character described comprising a bypass for exhaust gas adapted to be connected between the exhaust and intake conduits of an internal combustion engine, a member surrounding a portion of said bypass and forming therewith a passage for air to be heated by said exhaust gas; said passage communicating with said bypass beyond said heating portions thereof, means for supplying cooler air to said bypass, and means for controlling the admission of heated and cooler air into admixture with said exhaust gas.

69. An attachment for insertion between the exhaust and intake conduit of an internal combustion engine, comprising a stove member provided with an exhaust gas passage, an enclosure for said stove member providing therewith a passage for air to be heated, a cooler for exhaust gas, and a valve between the stove member and the cooler and serving in its various positions to mix hot exhaust gas and heated air and afford a passage for the exhaust gas from the stove member to the cooler.

70. In an internal combustion engine, means for supplying heated air and exhaust gas to the intake conduit, a valve for controlling the passage of said gases to the intake conduit; said valve including a member having an inlet port for heated air, an inlet port for exhaust gas, an outlet port for heated air and exhaust gas, and an outlet port for exhaust gas, and a rotor member disposed within said ported member and having openings to provide communication between said inlet ports and said first named outlet port in one position thereof, and between said exhaust gas inlet port and said last named outlet port in another position thereof.

In testimony whereof, I have signed my name hereto.

ARLINGTON MOORE.